Feb. 7, 1933.                E. R. ZADEMACH                1,896,149
                       TREATING OR WASHING MACHINERY
                     Filed Nov. 13, 1926    14 Sheets-Sheet 1
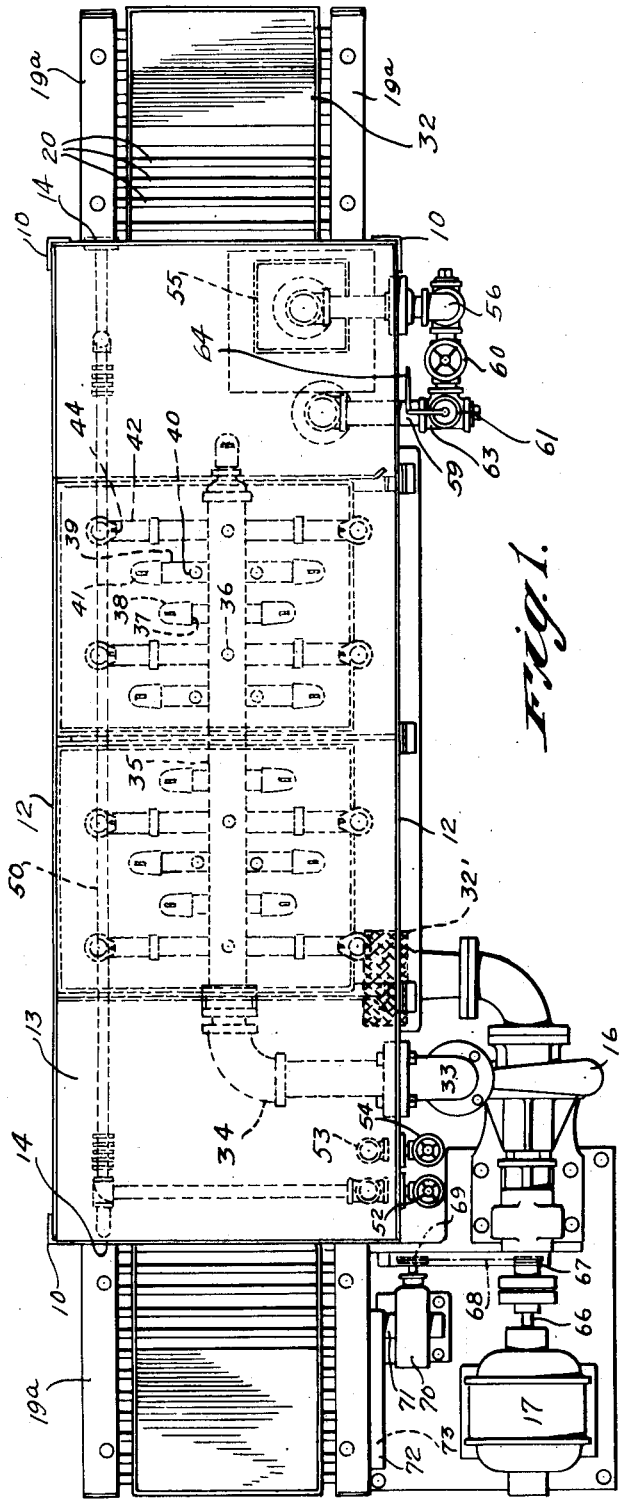

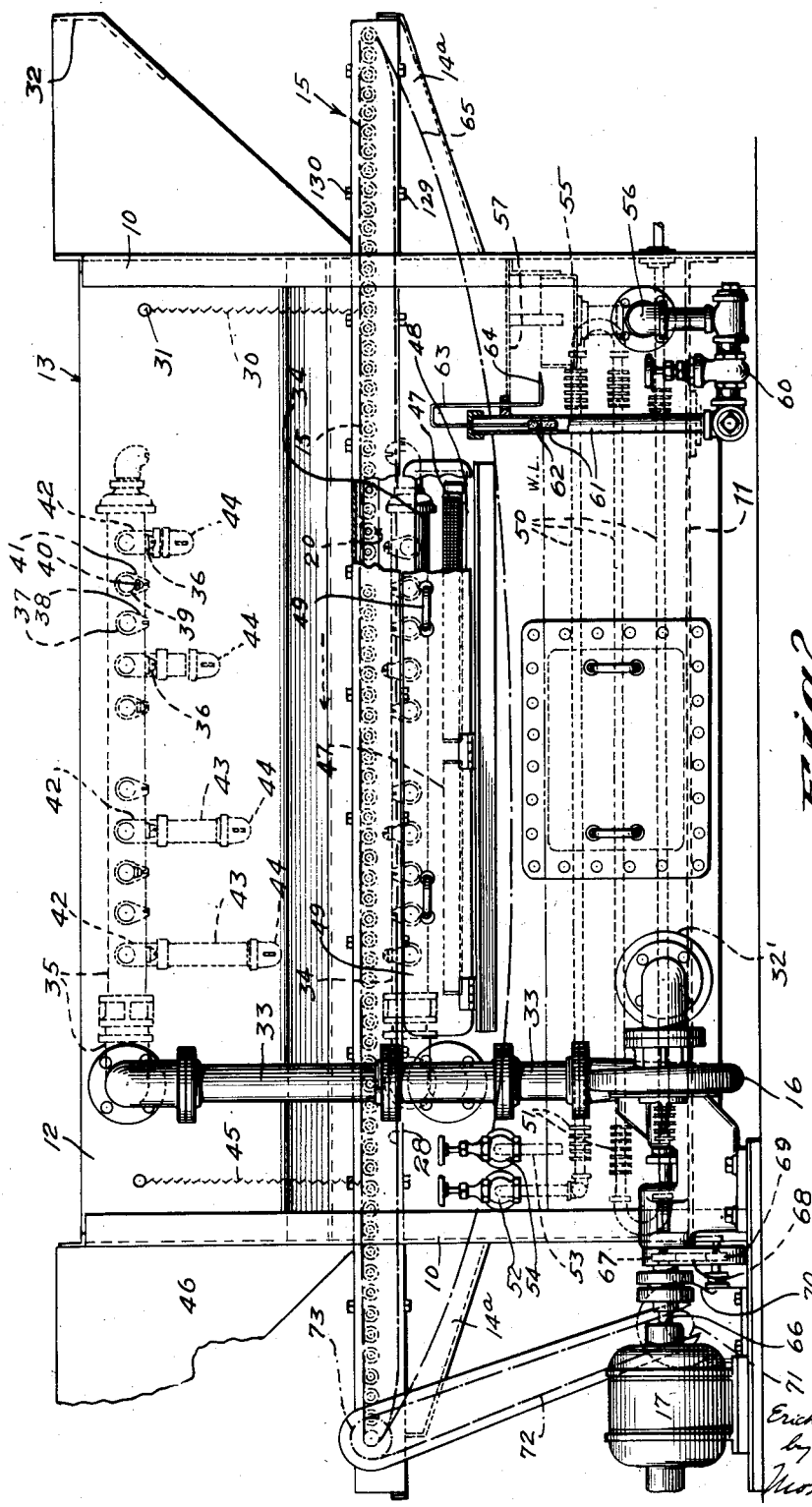

Feb. 7, 1933.  E. R. ZADEMACH  1,896,149
TREATING OR WASHING MACHINERY
Filed Nov. 13, 1926  14 Sheets-Sheet 3
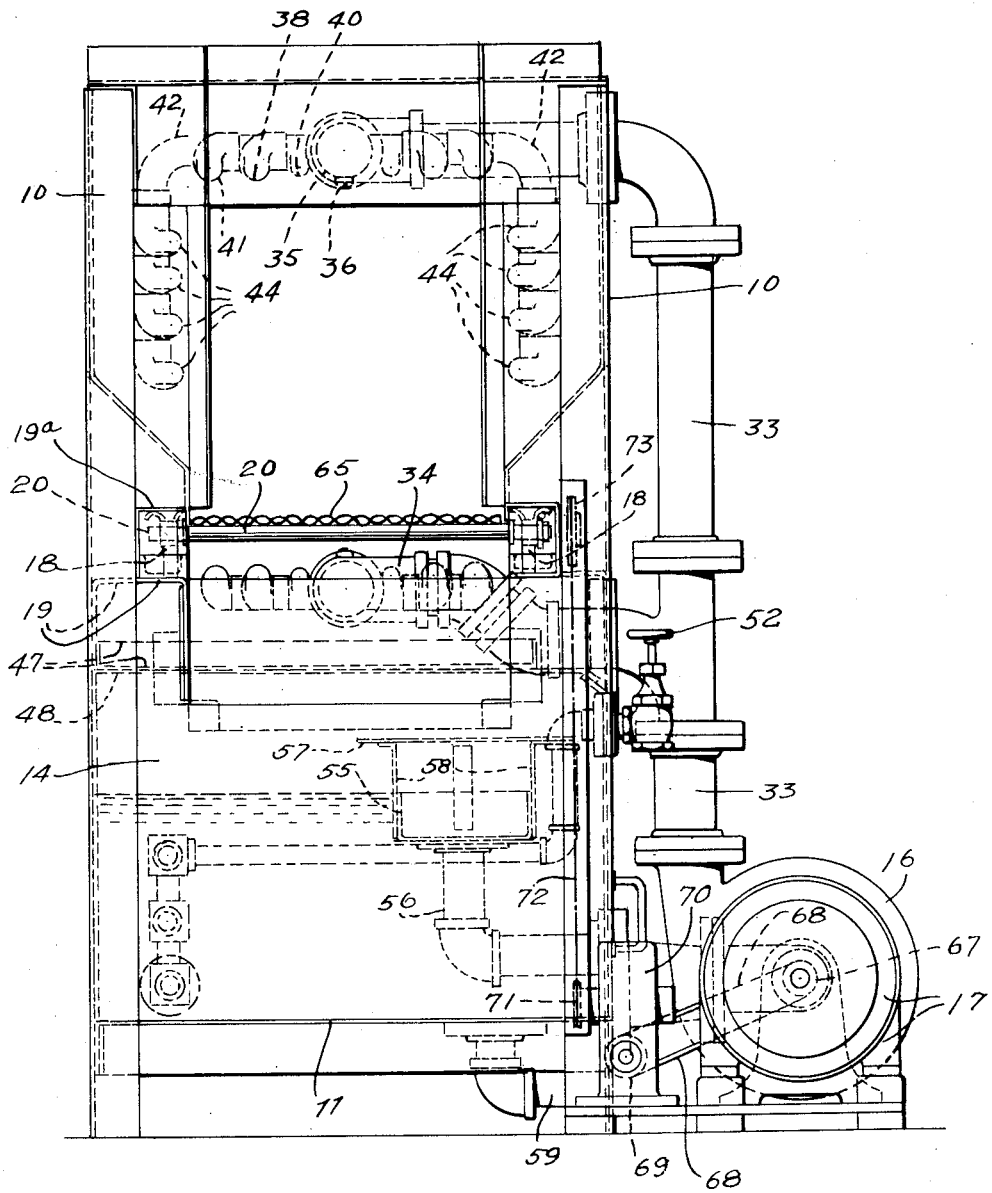

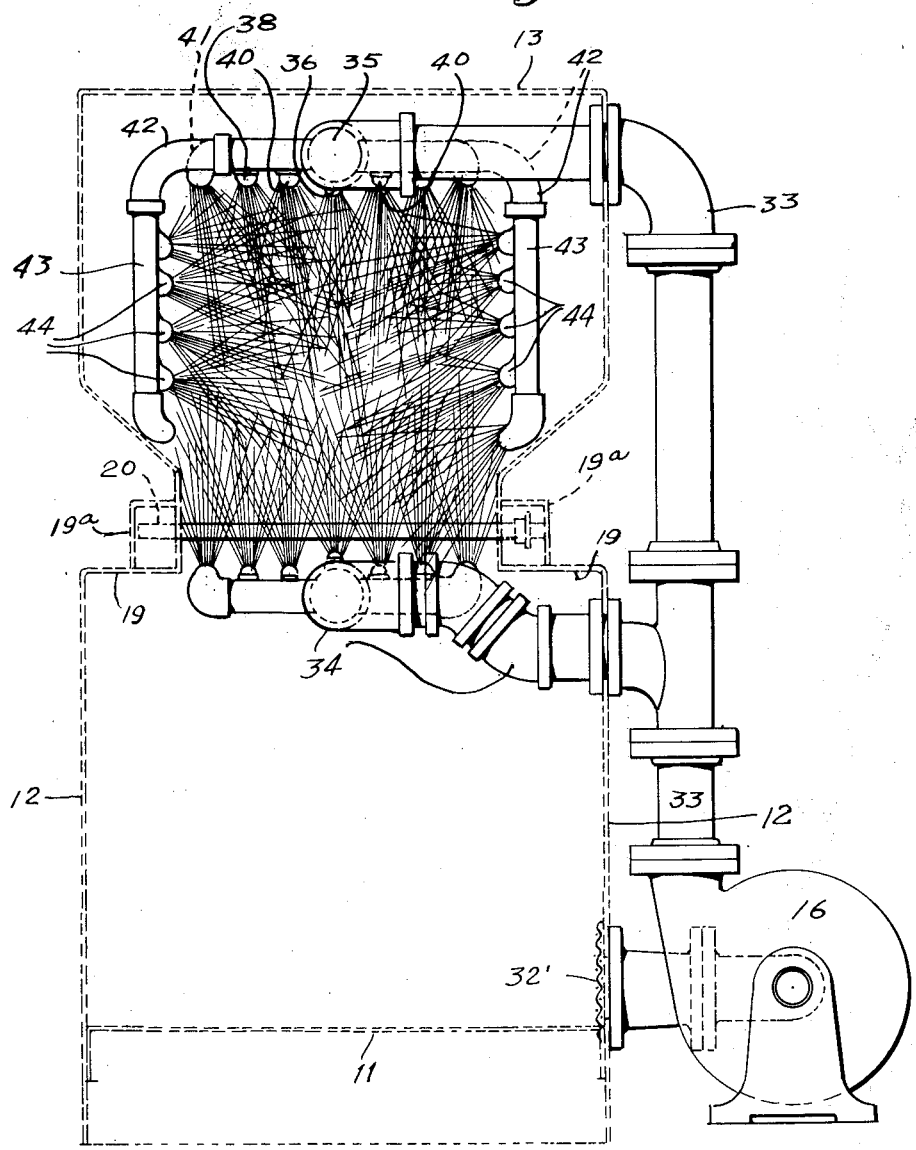

Feb. 7, 1933. E. R. ZADEMACH 1,896,149
TREATING OR WASHING MACHINERY
Filed Nov. 13, 1926 14 Sheets-Sheet 5
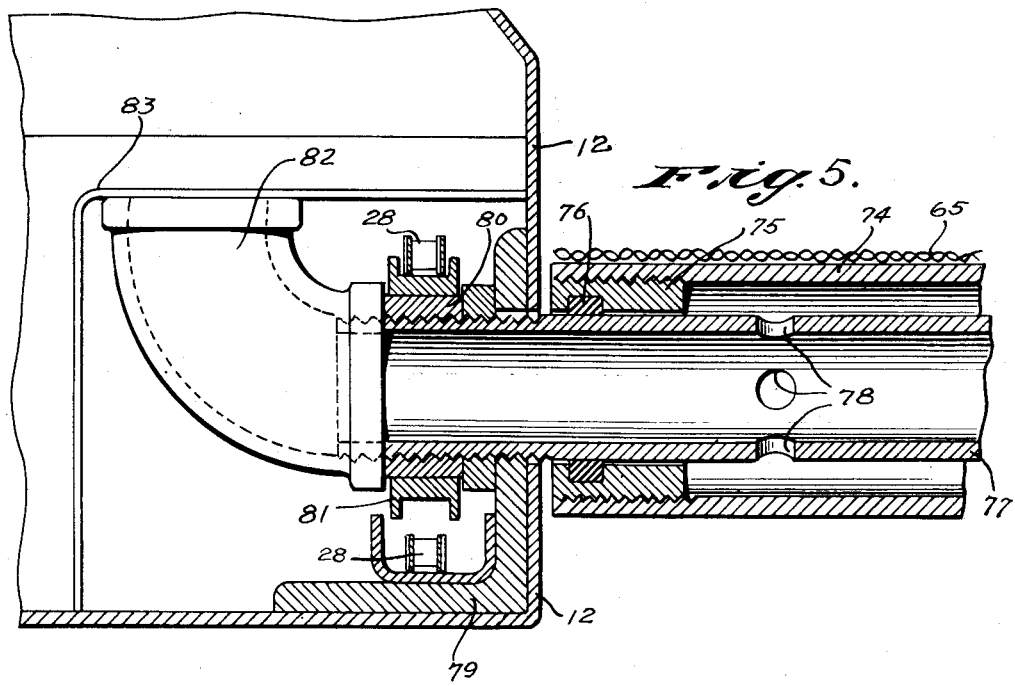
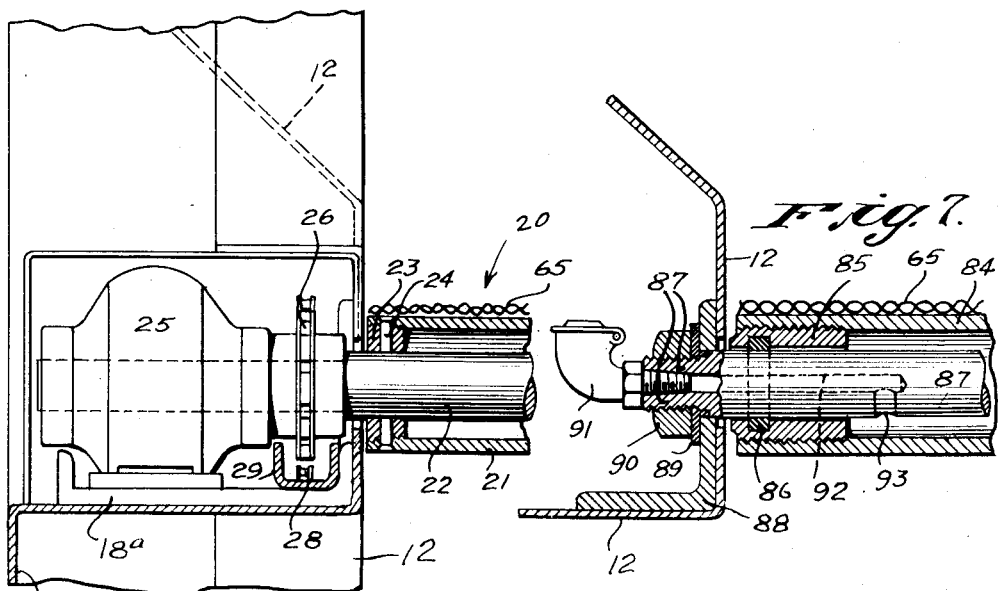

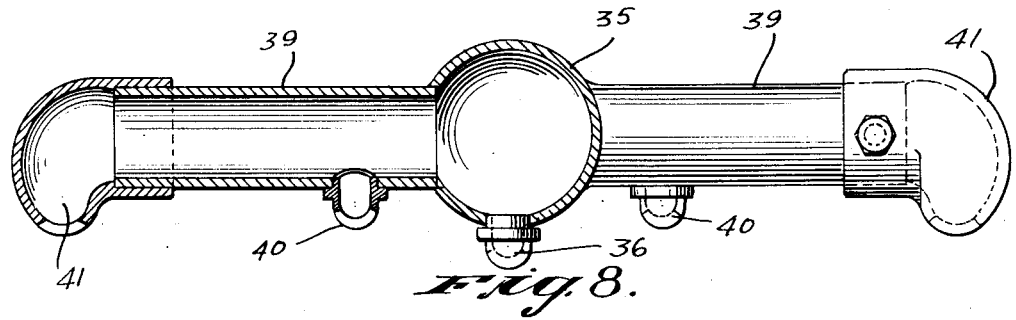
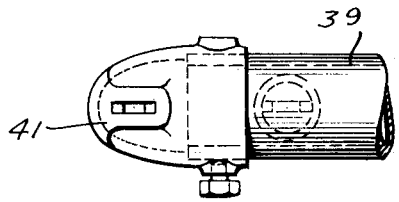
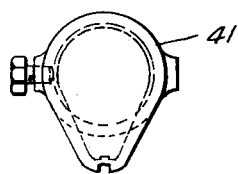
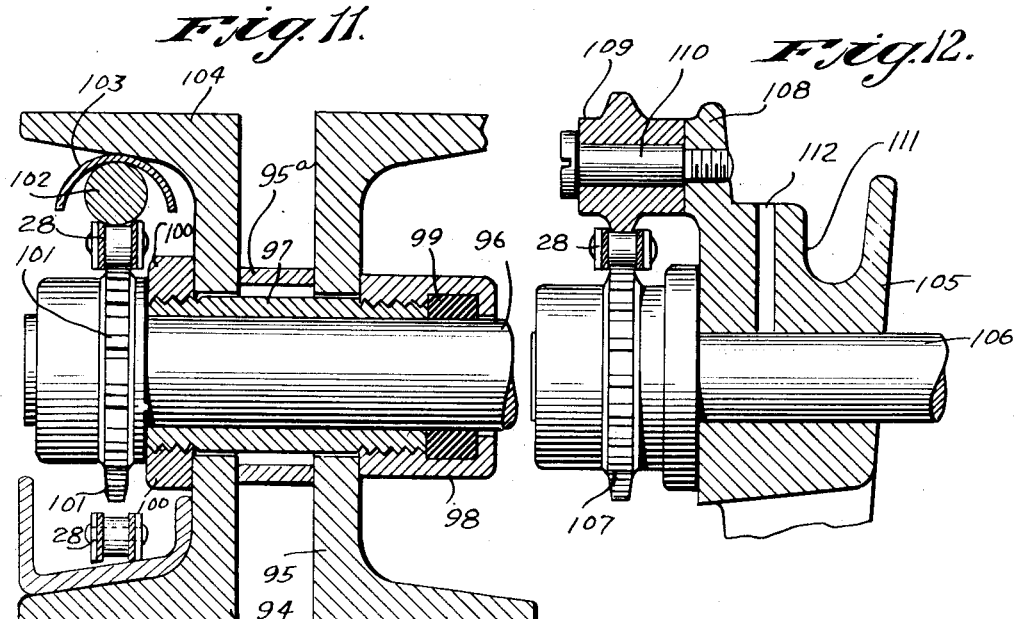
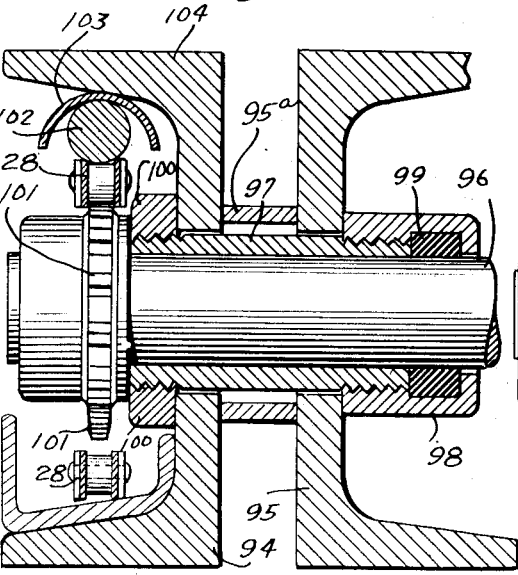
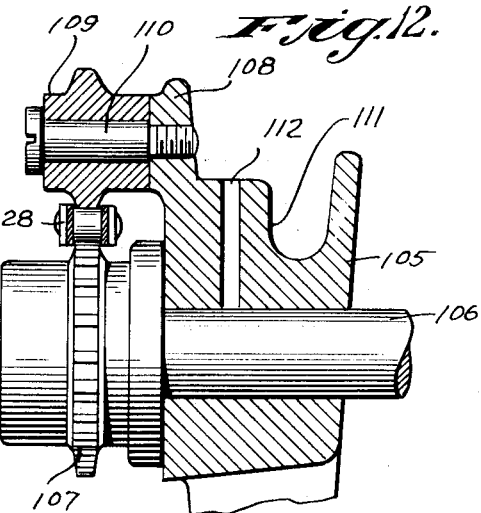

Feb. 7, 1933.  E. R. ZADEMACH  1,896,149
TREATING OR WASHING MACHINERY
Filed Nov. 13, 1926  14 Sheets-Sheet 7

INVENTOR
Erich R. Zademach
BY Moses and Nolte
ATTORNEYS

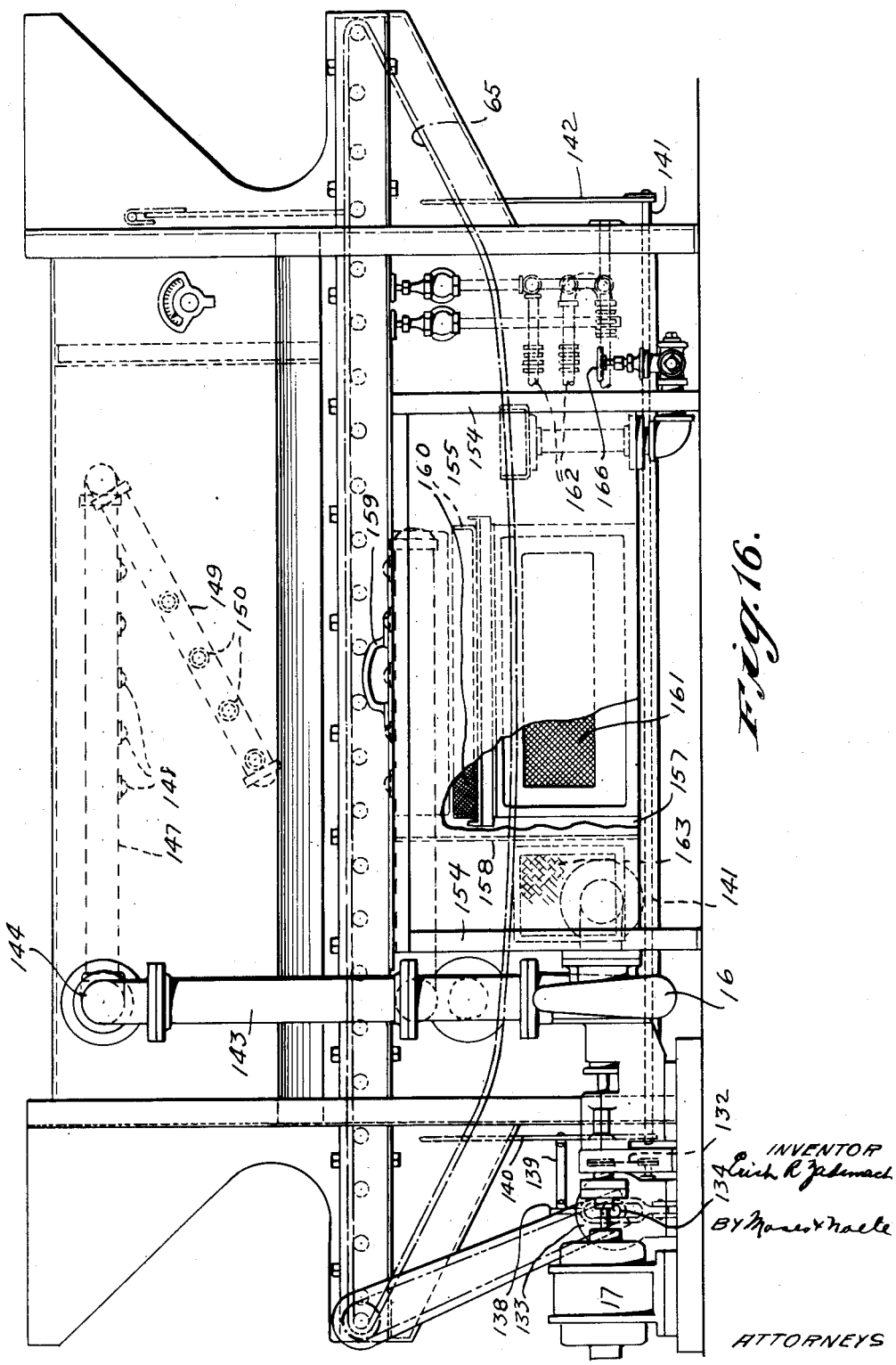

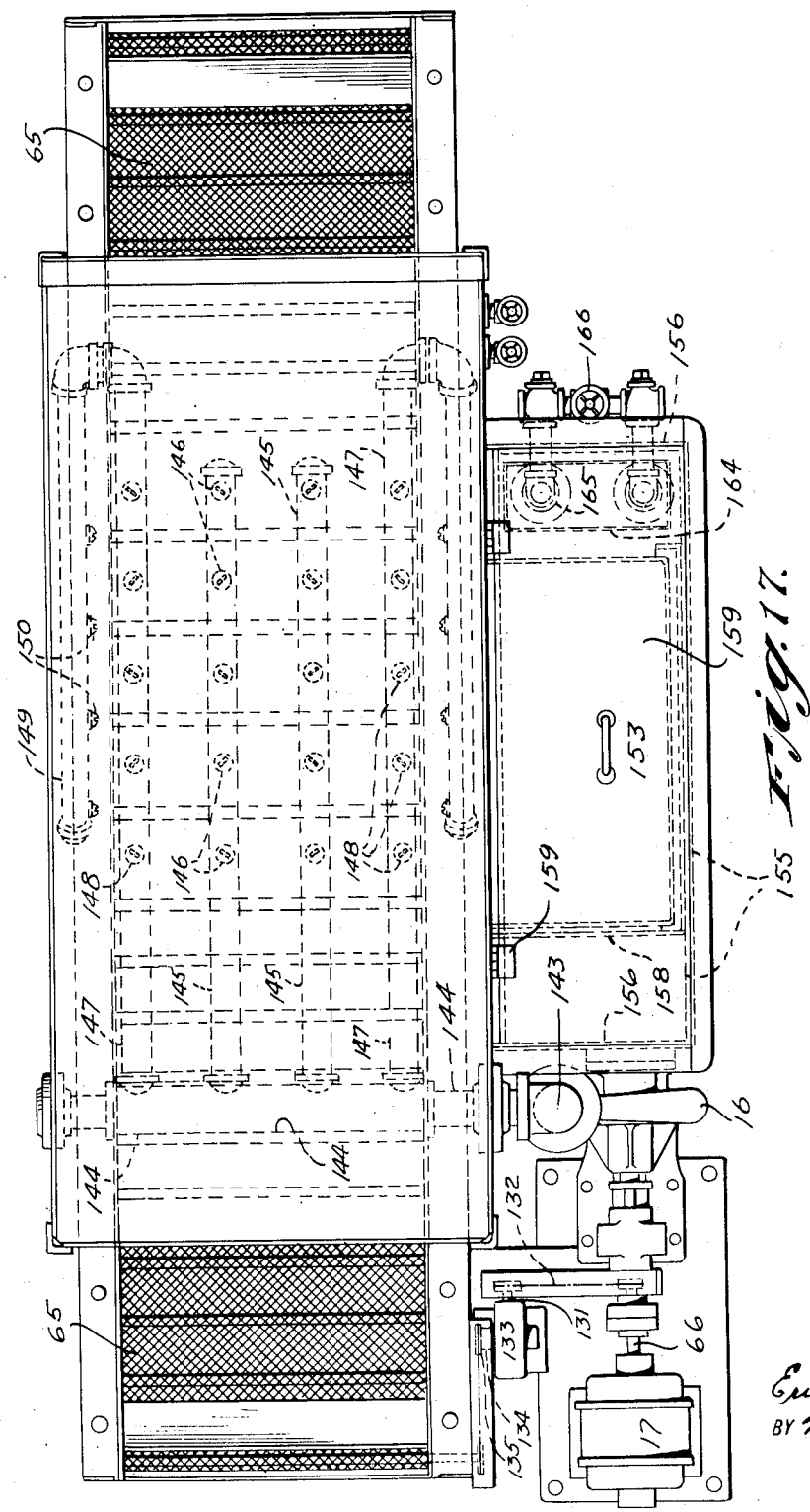

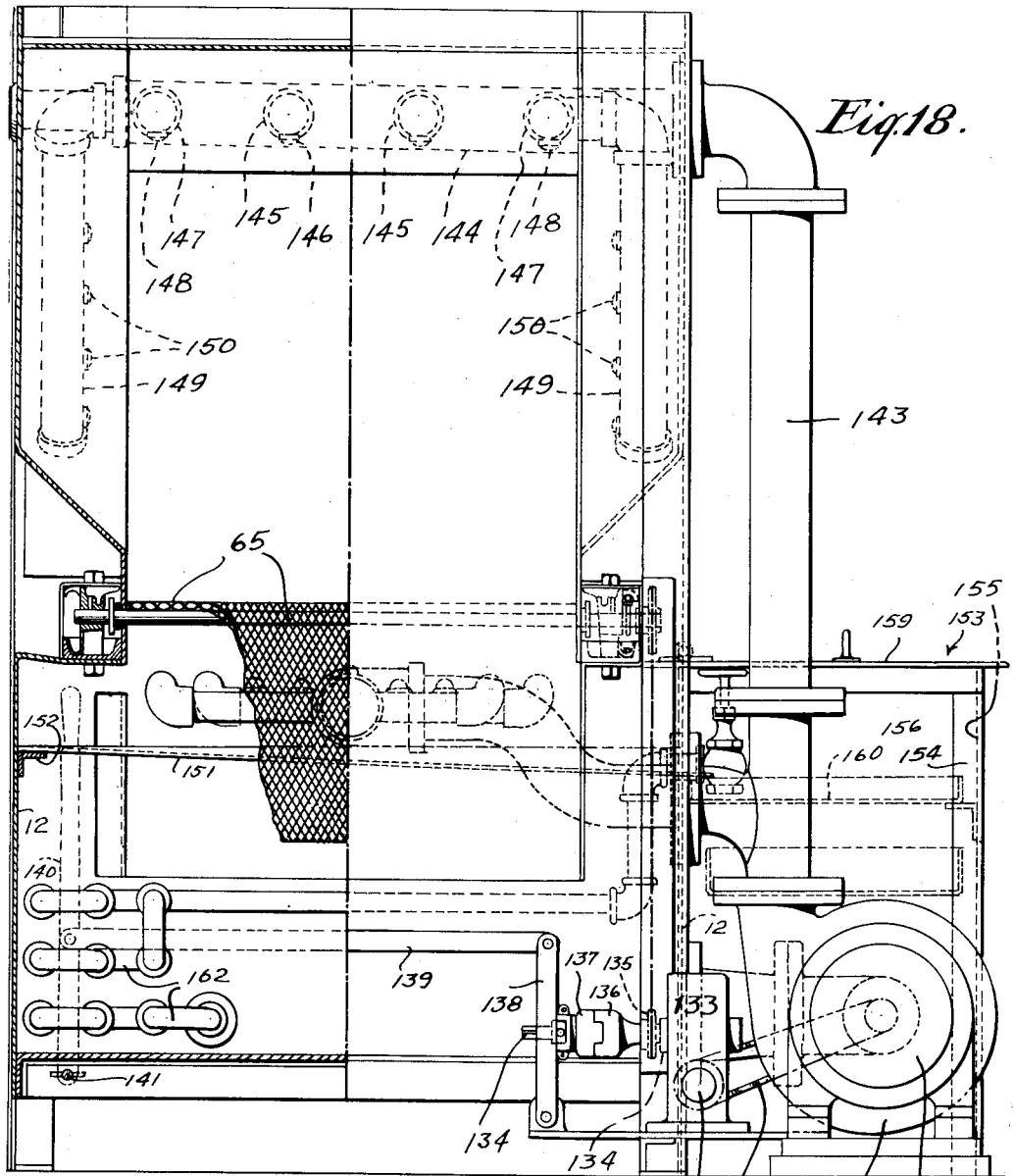
Fig.18.
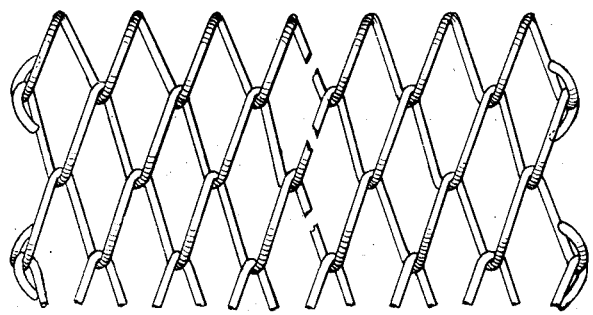
Fig.18ª.

Feb. 7, 1933.   E. R. ZADEMACH   1,896,149
TREATING OR WASHING MACHINERY
Filed Nov. 13, 1926   14 Sheets-Sheet 11
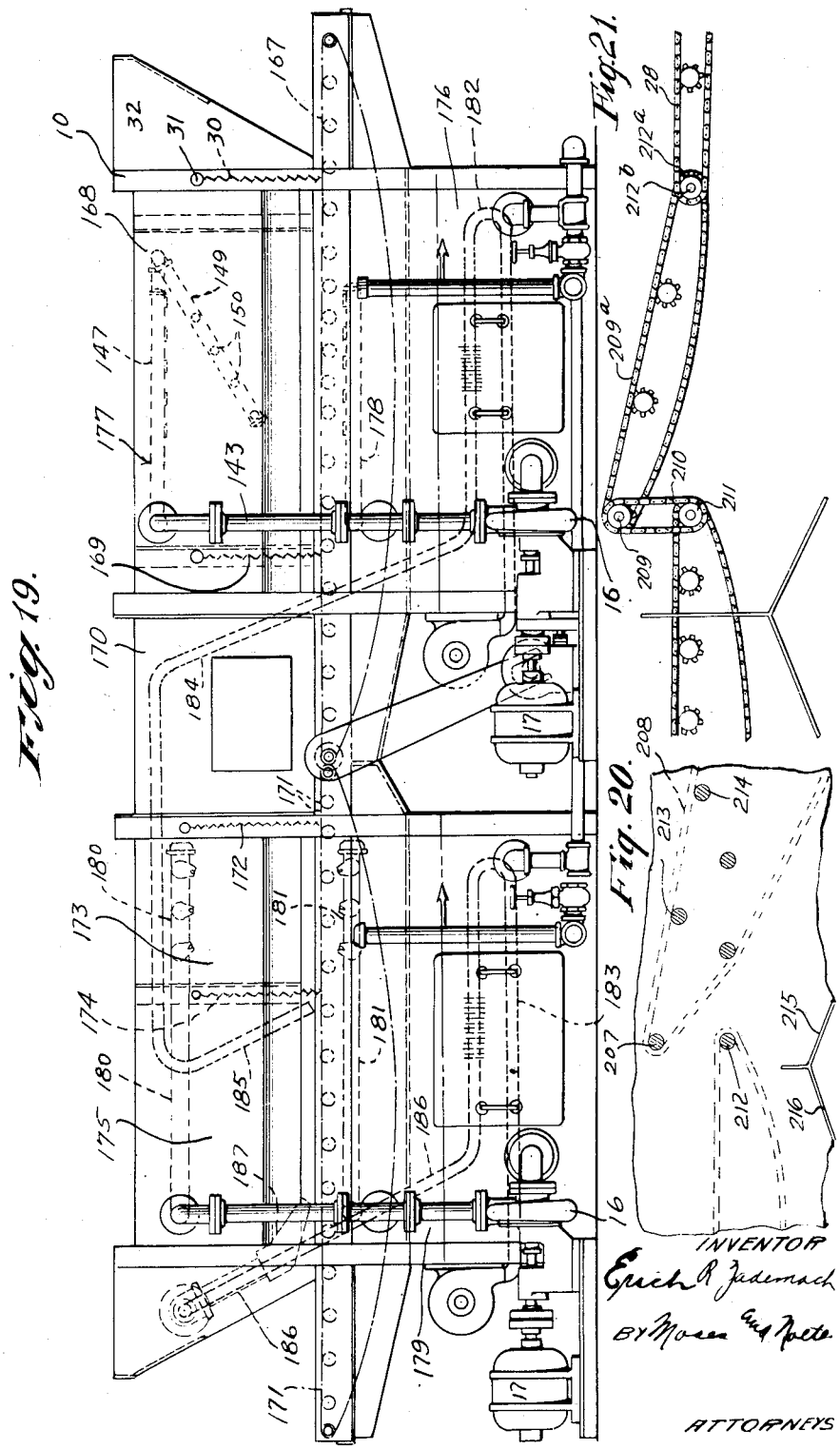

Feb. 7, 1933.  E. R. ZADEMACH  1,896,149
TREATING OR WASHING MACHINERY
Filed Nov. 13, 1926  14 Sheets-Sheet 12

INVENTOR
Erich R. Zademach
BY Moses and Noele
ATTORNEYS

Feb. 7, 1933.  E. R. ZADEMACH  1,896,149
TREATING OR WASHING MACHINERY
Filed Nov. 13, 1926   14 Sheets-Sheet 14

Patented Feb. 7, 1933

1,896,149

UNITED STATES PATENT OFFICE

ERICH R. ZADEMACH, OF ELIZABETH, NEW JERSEY, ASSIGNOR TO METALWASH MACHINERY COMPANY, OF NEW YORK, N. Y., A COPARTNERSHIP COMPOSED OF HERMAN BOEHME, ERICH R. ZADEMACH AND ALBERT C. NOLTE

TREATING OR WASHING MACHINERY

Application filed November 13, 1926. Serial No. 148,295.

This invention relates to the cleaning or other treating of articles and manufactured parts, and has for its principal object to provide means for treatment of such articles which will effect a saving in labor cost, floor space, treating material, and which will treat the articles more thoroughly and more conveniently than by the means heretofore employed, and under conditions which are comfortable and healthful to the persons necessarily engaged in the work.

To this end provision is desirably made of a machine comprising successive washing, rinsing, drying and oiling or slushing chambers, and of conveying means for passing the articles to be treated, successively through said chambers. In each of the chambers in which liquid materials are used, such as the cleaning solution, the rinsing water and the oil, the material is desirably projected under pressure upon the articles from opposite sides, and also from above and below them. These materials are supplied from reservoirs or tanks below the chambers and return by gravity to the reservoirs preferably through strainers. Provision is made for heating the liquids in the respective reservoirs.

The chambers in which the various operations are formed may form parts of separate, independent units, usable either separately or in combination with one another, or they may be formed as compartments of a continuous casing, but in either case the chambers are sufficiently enclosed to substantially seal them against the egress of steam or hot gases to the atmosphere. Suitable hoods and flues are provided at points where the articles enter and emerge from the chamber or from the continuous enclosure to collect and remove such steam and hot gases as escape.

Each chamber is provided with separate conveying means and with means for returning the drip from such conveying means to the reservoir associated with such chambers so that the treating material peculiar to that chamber is not carried out of the chamber by the conveyor and permitted to drip into other reservoirs of the system. This is desirably accomplished by forming the conveying means of a succession of closely spaced bodily fixed, driven rollers.

In case very small articles are to be treated, however, endless open network belts may be provided upon the rollers. Where this is done, a succession of endless belts is employed, each belt operating within a single chamber without substantially overlapping adjoining chambers. These belts are preferably arranged in series, however, so that articles are passed automatically from one belt to the next without attention and without having to emerge from the enclosure. The idle stretch of each conveyor belt is caused to pass through the chamber in which it operates in order to avoid dripping the treating materials outside the apparatus, and also to avoid the dissipation of heat by cooling of the belts.

A particular feature of the invention relates to the type of conveyor belt employed whereby the power consumption is greatly reduced, and the conveyors are caused to be sufficiently flexible to conform to end rollers of very small diameters. This enables the ends of the successive conveyors to be located so close together that no gap or trough intervenes between them of sufficient extent to obstruct the feeding of small articles from one conveyor to another. In the illustrative embodiment each conveyor consists only of transversely extending, zigzag wires which are interlaced with one another. The conveyor is light enough to be frictionally driven by driving rollers.

It is a further object of the invention to provide spraying means capable of delivering the treating material at high pressure and of distributing it substantially uniformly throughout the entire width of the conveying means and over a substantial length thereof, to treat the articles thoroughly and uniformly.

The machine disclosed is primarily designed for the cleaning or other indicated treatment of metallic articles or parts of articles or machines, but it is obviously capable of a variety of other uses.

Other features of the invention relate to means for recovering, straining, heating, and regulating the quantity of the treating materials, means for driving the conveyors, means for facilitating cleaning of the apparatus, and means for tilting or converting the articles being treated so as to discharge any liquids which may have gathered in concavities of the articles.

Features of the invention relating to the conveyor mechanism per se are not claimed herein but form the subject matter of my application Serial #223,468, filed October 1, 1927, for conveyors.

Other objects and advantages will hereinafter appear.

In the drawings forming a part of this specification:

Figure 1 is a plan view of an article treating unit which may be used either for washing, rinsing or slushing, according to the treating medium employed;

Figure 2 is a side elevation of the unit disclosed in Figure 1;

Figure 3 is an end elevation of the same unit as viewed from the delivery end thereof;

Figure 4 is an end elevation showing the arrangement of the spraying apparatus, the frame of the machine being indicated in broken lines;

Figure 5 is a detail, partly broken away, showing an idler conveyor roller and associated parts;

Figure 6 is a detail elevation, partly broken away, showing an end conveyor roller, the drive therefor, and other associated parts;

Figure 7 is a sectional elevation showing another of the conveyor rollers and associated parts;

Figure 8 is an end elevation, partly in section, showing a portion of the upper fluid projecting mechanism;

Figure 9 is a fragmentary, bottom plan view of an end of one of the projector branches;

Figure 10 is an elevation of the projector branch shown in Figure 9, as seen from one end thereof;

Figure 11 is a transverse, vertical section showing one method of mounting the conveyor rollers and the driving mechanism therefor;

Figure 12 is a similar sectional view showing a different mounting of the conveyor rollers and the driving mechanism therefor;

Figure 13 is a diagrammatic, side elevation showing the general arrangement of the roller driving sprockets and sprocket chain guides of Figure 12;

Figure 16 is a side elevation of a modified form of treating unit in which the roller driving and supporting means of Figures 14 and 15 are employed;

Figure 17 is a plan view of the treating unit shown in Figure 16;

Figure 18 is an end elevation, partly in section, of the unit shown in Figure 16;

Figure 18a is a detail fragmentary view of the wire conveyor;

Figure 19 is a side elevation of a combined washer, rinser and dryer; in which the waste gases of the heating elements are utilized for drying purposes;

Figure 20 is a fragmentary, sectional, side elevation of a modified form of the conveyor mechanism shown in Figure 19;

Figure 21 is a sectional, side elevation of the driving means for the modified conveyor of Figure 20;

Figure 15:
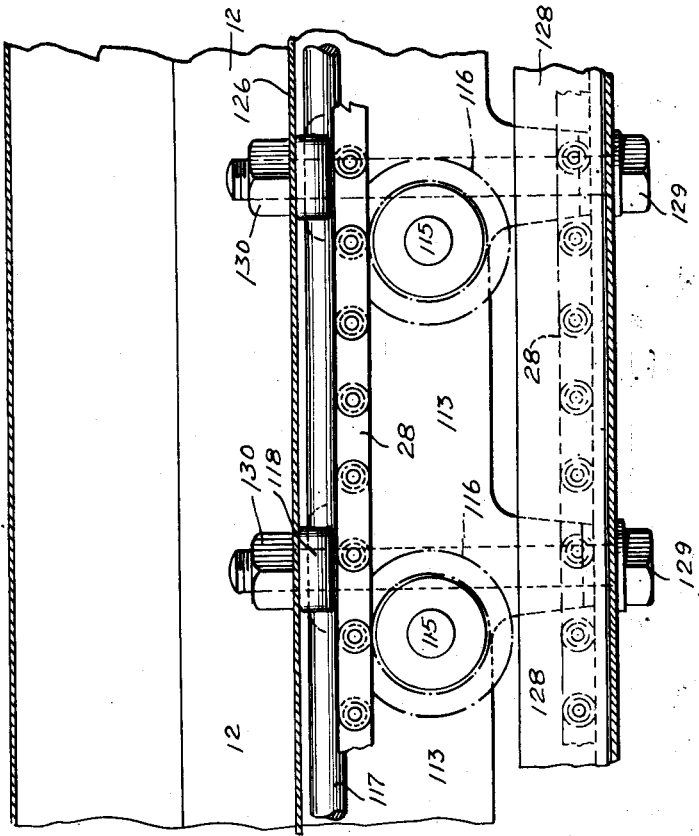
Figure 15 is a sectional, side elevation of the mechanism shown in Figure 14.

The unit of Figures 1 to 4 comprises angled corner standards 10, an angled bottom plate 11 secured thereto, longitudinal front and rear side plates 12, a cover or top 13, and end plates 14. The bottom, side and end plates cooperate to form a reservoir or tank in which a treating material, for example, a washing solution, is contained. Drain troughs 14a are extended outward from the end plates for draining material back into the tank.

A roller conveyor 15 is mounted to extend above the tank and protrude beyond the end walls thereof for feeding articles through a chamber of the enclosure formed by the sides 12 and top 13. Provision is made of a pump 16 driven by a motor 17 for pumping the treating material from the tank to a projector mechanism in the treating chamber which projects the material on the articles as they travel along the conveyor. The unit disclosed is usable either for washing, rinsing or slushing, but as a change from one of these uses to another involves only a change of the treating material in the tank, the unit will be described as a washing unit.

The conveyor mechanism may be supported upon longitudinally extending beams 18 which are mounted in side channels 19 formed in the side walls 12. The beams 18 project substantial distances beyond the ends of the enclosure to support conveyor bearings outside the enclosure, and are covered by gear guards 19a.

The conveyor desirably consists of a multiplicity of closely spaced, driven rollers 20 which do not move bodily, but are simply rotated to feed the work along. For this purpose the rollers may be arranged and constructed as shown in Figure 6. In this figure a cylindrical roller 21 is secured to a roller axle or shaft 22 by means of a bushing 23 threaded into the end of the roller and fixed to the shaft by means of pins 24. The shaft 22 projects through an opening in the side wall 12 and has its ends supported in a bearing 25 carried by a channel beam 18a. A sprocket 26 is fast on the shaft 22 and is driven by an endless chain 28. Where the conveyor consists only of individual rollers, as described, every roller is provided with a sprocket 26, so that all will be positively driven by the chain 28. The chain 28 travels in an oil trough 29 in one direction and runs upon the tops of the sprockets in the other direction for driving them. This type of conveyor is very advantageous in a machine of this character where the size of the articles is such as to permit the individual roller conveyor to be used. The conveyor may be driven with very little power, and involves no bodily movement of its parts, so that the parts which become heated in the treating chamber are not carried outside the chamber, where the heat might be dissipated. The rollers being bodily fixed do not carry the washing solution outside the enclosure where it would drip onto the floor or into other treating tanks containing other treating materials. One of the important features of the conveyor herein described is that the rollers continuously change contact with the part that is being washed, so that the entire surface of the part will be subjected to the washing solution. No portions of the surface of these parts, therefore, will remain unwashed, as is the case in machines in which the parts rest on comparatively wide bars which move along bodily with the parts being washed.

The articles placed on the receiving end of the conveyor are carried by the conveyor past a flexible curtain 30, see Figure 2, which hangs from a supporting rod 31 and substantially closes the introductory end of the treating chamber above the conveyor to prevent the escape of steam. A hood 32 is provided just outside the chamber and is connected to a flue (not shown) for carrying away such vapors as do escape from the chamber. The hood 32 is located within the horizontal bounds of the conveyor so that any condensed liquid dripping from the hood will be returned to the reservoir.

As the articles pass through the treating chamber, they are subjected to a spray of cleaning solution under pressure, directed upon them from opposite sides and also from above and from below. This treating solution is drawn from the tank by the pump 16, passing first through a strainer 32', Figures 1 and 4, thence through the pump, and thence through a conduit 33 to the projecting apparatus. The conduit 33 feeds a lower manifold 34 and an upper manifold 35. The upper manifold 35 is provided with downwardly directed nozzles 36, with short branches 37 having downwardly directed nozzles 38 at their ends, and with longer branches 39 having downwardly directed nozzles 40 intermediate their ends, and downwardly directed end nozzles 41. The manifold is further provided with long branches 42 which extend beyond the lateral bounds of the conveyor and have downward extensions 43 provided with inwardly directed nozzles 44.

The lower manifold is provided with branches similar to the branches 37 and 39 having upwardly directed nozzles corresponding to the nozzles 38, 40 and 41. This projecting apparatus is effective to project the washing solution in a substantially uniform manner over the entire width of the conveyor for a considerable extent of the travel thereof. It involves no relatively movable parts and hence the pressure supplied by the pump is not dissipated by friction nor consumed in producing motion of the projector parts, nor dissipated by leakage at the point of juncture of the relatively movable parts.

The articles, after having been sprayed by the projector to thoroughly cleanse them, continue along the conveyor and emerge past a flexible curtain 45 which substantially closes the delivery end of the chamber above the conveyor. A hood 46 is provided just outside the delivery end of the conveyor and connected with a flue (not shown) for conducting away any vapors that may escape through this end of the conveyor. The articles which have been washed may be deposited by the conveyor in a suitable receptacle or may be delivered by it to a conveyor of a subsequently used treating unit.

The washing solution which is projected within the chamber falls back into the tank after it has acted on the articles. In acting on the articles, however, it takes up considerable grit and other dirt which would be apt to wear out the pump and foul the solution to such an extent as to substantially impair its cleaning properties. Provision is accordingly made of strainer pans 47 Figure 2 which are slid into the upper part of the tank beneath the projector and rest upon supporting bars 48. These strainer pans may be removed at will without interrupting the operation of the machine through a hinged side door 49 provided in one of the side walls 12.

The washing solution, after passing through the strainer pans, falls into the tank. This tank is provided with an apparatus for heating the solution, which consists of a steam radiator comprising a plurality of coils 50 having radiating fins 51 thereon. These coils are arranged in a vertical bank adjacent the back side wall 12 of the tank. This arrangement is made possible because of the efficient radiation effected by the fins 51 which enables the number of steam coils to be very greatly reduced, as compared with a number of coils necessary if ordinary smooth piping were employed.

The arrangement of the coils in a vertical bank is desirable for several reasons. It leaves the floor of the tank clear, so that the floor can be conveniently scraped and thoroughly cleaned without obstruction whenever this is necessary. It further avoids the possibility of the coils becoming covered with dirt after a period of operation. The vertical arrangement of the coils is also advantageous for the reason that it facilitates drainage of water which condenses in the coils.

The admission of steam to the radiator coils 50 is controlled through a manually operated valve 52. The operator is governed in controlling the admission of steam by a thermometer (not illustrated) which shows the temperature of the washing solution. Water may be admitted to the tank through a water supply pipe 53, as desired.

The level of the water in the tank is controlled by a skimming bowl 55 Figures 2 and 3 which communicates through a conduit 56 with a waste conduit. The skimming bowl 55 is located, to maintain the level of the washing solution, above the radiator coils but below the strainer pans 47. A guard or shelter plate 57 is supported above the skimming bowl 55 by means of fingers 58 projecting upward from the bowl, to prevent the projector dripping the washing solution into the skimming bowl.

Provision is also made of a drain pipe 59 Figure 3 communicating with the bottom of the tank and with the waste conduit. This drain pipe is normally closed by a manually operable valve 60 Figures 1 and 2 but may be opened when desired to permit the washing solution to be emptied.

Outside the tank the drain pipe 59 has a vertical pipe 61 extending upward from it. This pipe terminates above the level of the skimming bowl so that it will never overflow. A float 62 in the pipe 61 carries an inverted U-shaped stem 63 which extends upward through the upper end of the pipe 61, is then bent back to extend downward outside the pipe 61 and, at its lower end, is bent horizontally to provide a level indicating pointer 64. This pointer cooperates with a gage mark on the outside of the tank located at the level of the top of the skimming bowl so that a depletion of the washing solution is revealed to the operator by this means.

While the use of the apparatus with the individual roller conveyor, as described, is satisfactory and very desirable with articles of sufficient size to travel on a conveyor of this type, it is, nevertheless, desirable to provide an endless conveyor to run upon the rollers when smaller articles are being washed. For this purpose provision may be made of a wire belt 65 formed as a net work or screen to run upon the conveyor. This type of endless conveyor is flat, is of very light construction, and can be driven with very little power consumption. The details of the construction of the conveyor will be described in connection with a subsequent embodiment of the machine in connection with which the conveyor is more fully illustrated.

Due to the fact that the conveyor can be driven with so little power and that the pumping power is utilized so efficiently for projecting the washing solution under pressure, it is feasible in the present machine to drive both the conveyor and the pump from the single motor 17.

The motor 17 is mounted with its shaft 66 in alignment with the driving shaft of the centrifugal pump 16, and is coupled to drive the latter. A sprocket 67 driven by the motor is connected through a chain belt 68, sprocket 69, reduction gearing (not shown), which is mounted in the housing 70, shaft 71, a sprocket (not shown), a combined belt and chain 72, and a sprocket 73 to drive the chain 28 for rotating the conveyor rollers 20. A clutch is provided for making or breaking the connection from the motor to the chain 72, so that the conveyor may be started or stopped independently of the pump, this clutch being omitted from the drawings for sake of simplicity, being in all respects similar to the clutch mechanism shown in Figures 16 to 18. It will be observed that the operating unit consisting of the motor, the pump and the speed reducer, is mounted on a base plate separate from the machine, in a position to be readily accessible for oiling, inspection or repair.

Where the wire conveyor is used, it is unnecessary to positively drive all of the conveyor rollers. Only a part of the rollers need be constructed, as shown in Figure 6, with the sprockets 26 provided for driving. Some of the rollers, at least, can be made idler rollers, as shown in Figures 5 and 7.

In Figure 5 the roller is shown as comprising a hollow cylinder 74, a bushing 75 threaded in the end thereof, and a felt packing 76 in the bushing. This roller is rotatable upon a hollow bearing shaft 77 having oil ports 78 therethrough for transmitting lubricant to the bearing 76. The bearing shaft 77 extends through the channeled portion of the wall 12 and is supported in an L-shaped beam 79. A bearing 80 threaded upon the external portion of the shaft 77 rotatably supports an idler pulley 81 on which the chain 28 runs. A lubricant feeding elbow 82 is threaded onto the end of the bearing shaft 77. When it is desired to supply lubricant to the bearing 76, an L-shaped cover plate 83 common to the whole series of elbows 82 is removed and lubricant is injected in the open ends of the elbows.

In Figure 7 there is shown a slightly different arrangement for mounting and lubricating the idler rollers. This arrangement may be used instead of the arrangement shown in Figure 5, or it may be used in the same machine, certain of the idler rollers being arranged as shown in Figure 5, and others of them being arranged as shown in Figure 7. In Figure 7 the roller comprises a hollow cylinder 84 having a bushing 85 threaded into its end and a felt washer 86 carried by said bushing. The roller is rotatably mounted on a solid fixed bearing shaft 87. The bearing shaft 87 extends through the side plate 12 at the back of the machine and is supported in an L-shaped beam 88. A gasket or washer 89 is compressed against the vertical web of the beam 88 by a nut 90 to seal the space through which the shaft passes, and prevent egress of vapors or spray from the treating chamber. An oil cup 91 is threaded into the end of the shaft 87 and communicates through axial and radial bores 92 and 93 with the interior of the roller for feeding lubricant to the bearing 86.

In Figure 11 there is illustrated in detail a modified means for supporting and driving the driven rollers of the conveyor, the rollers also being of a modified form. A plurality of U-shaped beams 94 and 95, separated by spacers 95a, are supported back to back in the channeled portion of the front side plate 12 (not shown in Figure 11). The conveyor roller shaft 96 is mounted in a bearing sleeve 97 supported by the vertical webs of these beams. A cap 98 is threaded onto the inner end of this bearing sleeve 97 and compresses a packing washer 99 against the end of the bearing sleeve and against the periphery of the roller shaft 96. A nut 100 is threaded on the outer end of the bearing sleeve 97 into engagement with the beam 94 for securely fixing the position of the bearing sleeve 97. A sprocket 101, fast on the outer end of the roller shaft 96, is driven by the chain 28. A rod 102 bears against the upper face of the chain to hold it down into engagement with the teeth of the sprockets 101. This rod is supported from above by a downwardly concave, arcuate shell 103, the upper convex surface of which bears against the upper horizontal flange 104 of the beam 94. The rod 102 nests in the chain and is effective through the chain to prevent longitudinal sliding of the roller shafts 96 in their bearings.

In Figures 12 and 13 a further modification of the supporting, lubricating and driving means for the rollers is shown. A bearing beam 105 supported in the external channeled portion of the front side plate 12 forms a bearing for the conveyor roller shaft 106. The conveyor roller shaft is provided with a sprocket 107 at its outer end which is driven by the chain 28. The bearing beam 105 has an upwardly extending flange 108 from which guide pinions 109 are supported by horizontal stud screws 110. These guide pinions 109 are arranged substantially as illustrated in Figure 13 with reference to the chain 28 and the sprocket 107. The pinions mesh with the chain and hold it down into meshing engagement with the sprockets 107. The bearing pin 105 has a longitudinally extending oil channel 111 therein and is provided with lubricating passages 112 that extend downward in communication with the bearing portion of the beam. Wicks may be inserted in these passages 112 and may have their outer ends immersed in the lubricant in the channel 111.

Figure 14:
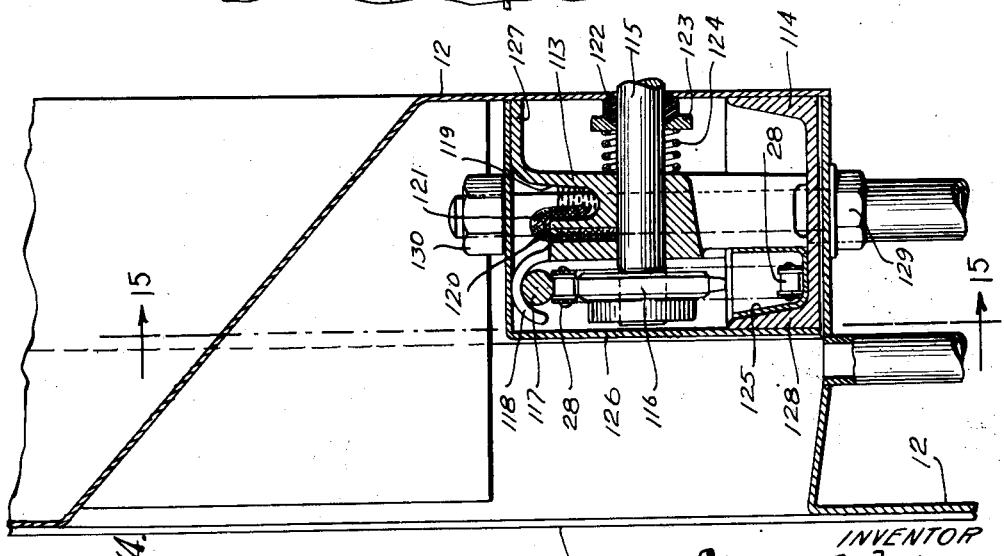
Figure 14 is a sectional elevation showing a further modification of the means for supporting and driving the conveyor rollers.

In Figures 14 and 15 a further modification of the roller, supporting and driving mechanism is shown. This construction is further illustrated in Figure 18. A bearing beam 113 is supported in a channel beam 114 in the external channeled portion of the front side plate 12. A conveyor roller shaft 115 extends through the side plate 12 and is rotatably supported in a bearing formed in the bearing beam 113. The outer end of the roller shaft 115 has a sprocket 116 fixed thereon which is driven by the chain 28. The chain 28 is held down into engagement with the sprockets 116 by a longitudinally extending, cylindrical rod 117 supported in a downwardly concave projection or flange 118 of the bearing beam 113. The bearing beam is provided with an oil channel 119 and oil passages 120, as described in connection with Figure 12. Wicks 121 are provided to transmit the oil from the channel 119 through the passages 120 to the bearing surfaces of the roller shaft 115 of the bearing beam 113. Provision is made of a gasket 122 encircling the roller shaft 115 and engaging the outer face of the side plate 12. This gasket is pressed into sealing engagement with the roller shaft 115 and side plate 12 by a washer 123 and a coil spring 124 interposed between the washer and the face of the bearing beam 113. The idle stretch of the chain 28 runs in an oil trough 125 supported beneath the chain by the channel beam 114. An angle cover 126 is provided for the chain and bearing members, being arranged to fit against a horizontal flange 127 of the bearing beam, the arcuate flange 118 of the bearing beam and a vertical flange 128 of the channel beam 114. This cover is held securely in position by means of bolts 129 passed upward through the beams 114 and 113 and through the cover 126, which bolts have nuts 130 threaded upon their upper ends.

In Figures 16 to 18 there is disclosed a modified form of treating unit. This form is generally similar to the form already described in connection with Figures 1 to 4, but also includes a number of features different from Figures 1 to 4, as hereinbelow described.

The drawings illustrated in the present modification serve to show the clutch in the transmission from the motor 17 to the conveyor whereby the conveyor may be stopped, if desired, while the pump 16 continues in operation, so that the articles can be arrested in the washing chamber and subjected to a washing operation of longer than normal duration. The motor shaft is connected to drive a transmission shaft 131 through a chain 132. The transmission shaft is connected through reduction gearing in the housing 133 to the further transmission shaft 134 having a sprocket 135 rotatably mounted thereon. The sprocket 135 is fast to a clutch member 136, more clearly shown in Figure 18, which is rotatable on the shaft 134. A mating clutch member 137 is keyed to the shaft 134 so as to be slidable longitudinally on the shaft, but positively rotatable by the shaft. A shifter link 138 controls the clutch member and is connected through a link 139 with a clutch shifting lever 140. The lever 140 is fast at its lower end on a rock shaft 141 which extends longitudinally to the opposite end of the machine and there has fast upon it a second clutch shifting lever 142. With this construction it is possible for an operator at either end of the machine to disconnect the conveyor from the motor while permitting the pump to continue in operation.

The wire mesh conveyor is fully disclosed in Figures 17, 18 and 18a. The utilization of a conveyor of the form shown constitutes an important feature of the invention. The conveyor 65 is made up entirely of zigzag strands of wire which extend transversely of the conveyor. These wire strands are interlaced so that any one of the wires can be removed simply by straightening out one of its ends and withdrawing it while rotating it. The wire which is being withdrawn twists itself out of the contiguous wires immediately in front of and behind it by this screwing action. It will be seen that the conveyor can be adjusted as to length by withdrawing two of these wires separated from one another a sufficient distance to eliminate the surplus length and by then rethreading a single wire through to re-unite the conveyor ends. A conveyor constructed in this manner is flat, is very light and is capable of conforming to the contour of a very small end roller so that where successive conveyors are used, there is no trough of any substantial depth between the ends of the adjacent conveyors which would form an obstruction to the feeding of articles automatically from one conveyor to another.

The upper projector manifold of Figures 16 to 18 includes features differing from the manifold previously described. The pipe 143 delivers the washing solution to an upper manifold 144 that extends transversely of the conveyor. This manifold is provided with branches 145 which extend longitudinally of the conveyor and are provided with downwardly directed nozzles 146. The manifold is also provided with longitudinally extending branches 147 adjacent the side edges of the conveyor which have downwardly directed nozzles 148. These branches 147 are turned outwardly and rearwardly at their upper ends remote from the manifold and are provided with downwardly inclined extensions 149 which lie outside the lateral bounds of the conveyor and are provided with inwardly directed nozzles 150. The fact that these extensions 149 incline downward from the introductory and toward the delivery end of the conveyor results in an application of the washing streams at the upper parts of the articles first and successive applications at lower levels as the articles progress, so that the wash is effected as to this part of the apparatus from the top downward.

The tank structure in Figures 16 to 18 embodies important features of the invention. A main heating tank is provided in the bottom of the enclosure as before but the projected washing solution is not permitted to return directly to this main tank. A drain plate or baffle 151 is supported by a shell 152 and the lower edge of an opening in the front side plate 12 to conduct all of the returning solution through the opening in plate 12 into a side tank 153 at the front of the machine. The side tank 153 comprises angled corner posts 154, a front plate 155, end plates 156 and a bottom 157, as well as the front side plate 12 of the main enclosure. The side tank is divided longitudinally into two compartments by a solid partition 158 (see Figure 16). The returning solution is directed into the larger of these compartments which is toward the introductory end of the machine. The side tank is closed by a hinged cover 159 which may be opened to give access to the interior of both the side and main tanks, the drain plate 151 being removable when the cover 159 is opened so as to expose the interior of the main tank. A strainer pan 160 is removably supported in the side tank just below the delivery end of the baffle 151 so as to strain the returning solution.

At a substantial distance from the bottom of the large compartment in the side tank, provision is made of a strainer 161 in the side wall 12 which divides the side tank from the main tank. The solution which returns to the side tank passes through the strainer 161 into the main tank. The strainer 161 thus prevents the carrying of dirt into the main tank. The fact that the strainer 161 is located at a substantial distance from the bottom of the side tank causes a sludge space of substantial depth to be provided in the side tank for the accumulation of dirt. The washing solution is heated in the main tank by a radiator 162 and passes from the main tank through a strainer 163 Figure 16 in the side wall 12, to the small compartment of the side tank which is in communication with the pump 16.

The mounting, driving and lubricating of the conveyor rollers in this form of the invention is like that disclosed in Figures 14 and 15, which has already been described.

In this form of unit a skimmer cup 164 and a drain pipe 165 are provided in the large compartment of the side tank and are controlled in the manner previously described by a manually operable valve 166.

Figure 22:
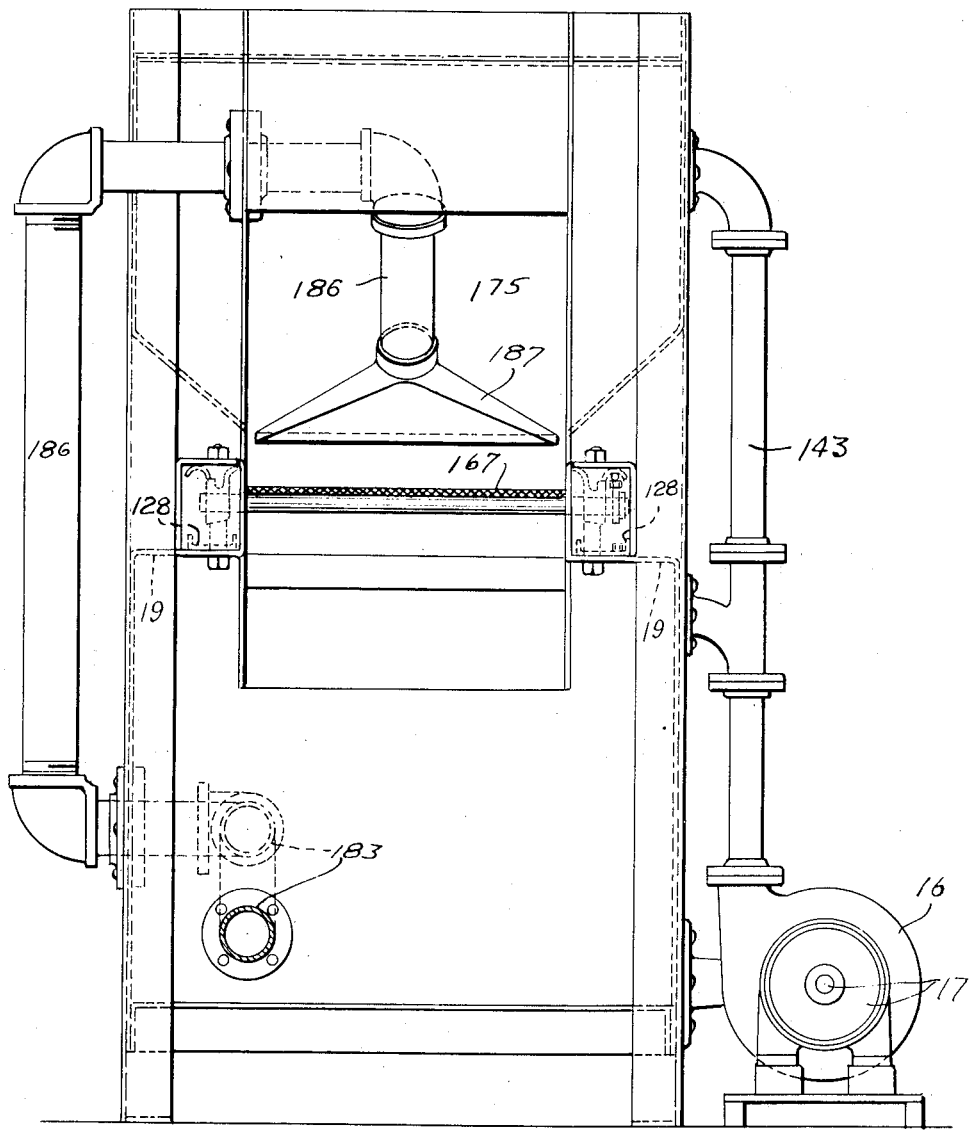
Figure 22 is an end elevation of the combined mechanism of Figure 19.

In the form of the invention disclosed in Figures 19 and 22 there is disclosed a combined washing, rinsing, and drying unit which may be described roughly as made up of two of the treating units disclosed in Figures 1 to 4. This mechanism differs, however, from the form disclosed in Figures 16 to 18, in that the heating means is varied, and provision is made for blowing hot gases on the washed and rinsed parts before they emerge from the machine.

The articles are fed onto a conveyor 167 and are passed by it through a washing chamber 168, thence past a screen 169 into a drip chamber 170. Within the drip chamber they are transferred from the conveyor 167 to a similar subsequent conveyor 171 which carries them out of the drip chamber past a curtain 172 into a rinsing chamber 173, thence past a curtain 174 into a drying chamber 175. From the drying chamber the articles are carried out of the machine by the conveyor 171.

In this form of the invention the washing solution is contained in the washing tank 176 and is projected on the articles through projector manifolds 177 and 178 in the washing chamber. The rinsing water is contained in a rinsing tank 179 and is projected on the articles in the rinsing chamber 173 by an upper projector 180 and a lower projector 181.

The washing solution and the rinsing water are not heated by steam coils in this form of the invention, but are heated by immersed gas heating pipes or stoves consisting of coils 182 and 183 respectively, in which combustible gases are burned. A mixture of gas and air is fed into the coil 182 and burns in the coil, heating the washing solution in the tank 176. The products of combustion then pass along the upwardly extending pipe section 184 and are led over into the drying chamber 175 and projected downward upon the articles travelling on the conveyor by the downwardly directed end 185 of the pipe. Similarly the products of combustion from the coils 183 are led through the upwardly extending pipe section 186 to a downwardly directed nozzle 187 which projects the hot gas on the articles in the drying chamber 175

Figure 23:
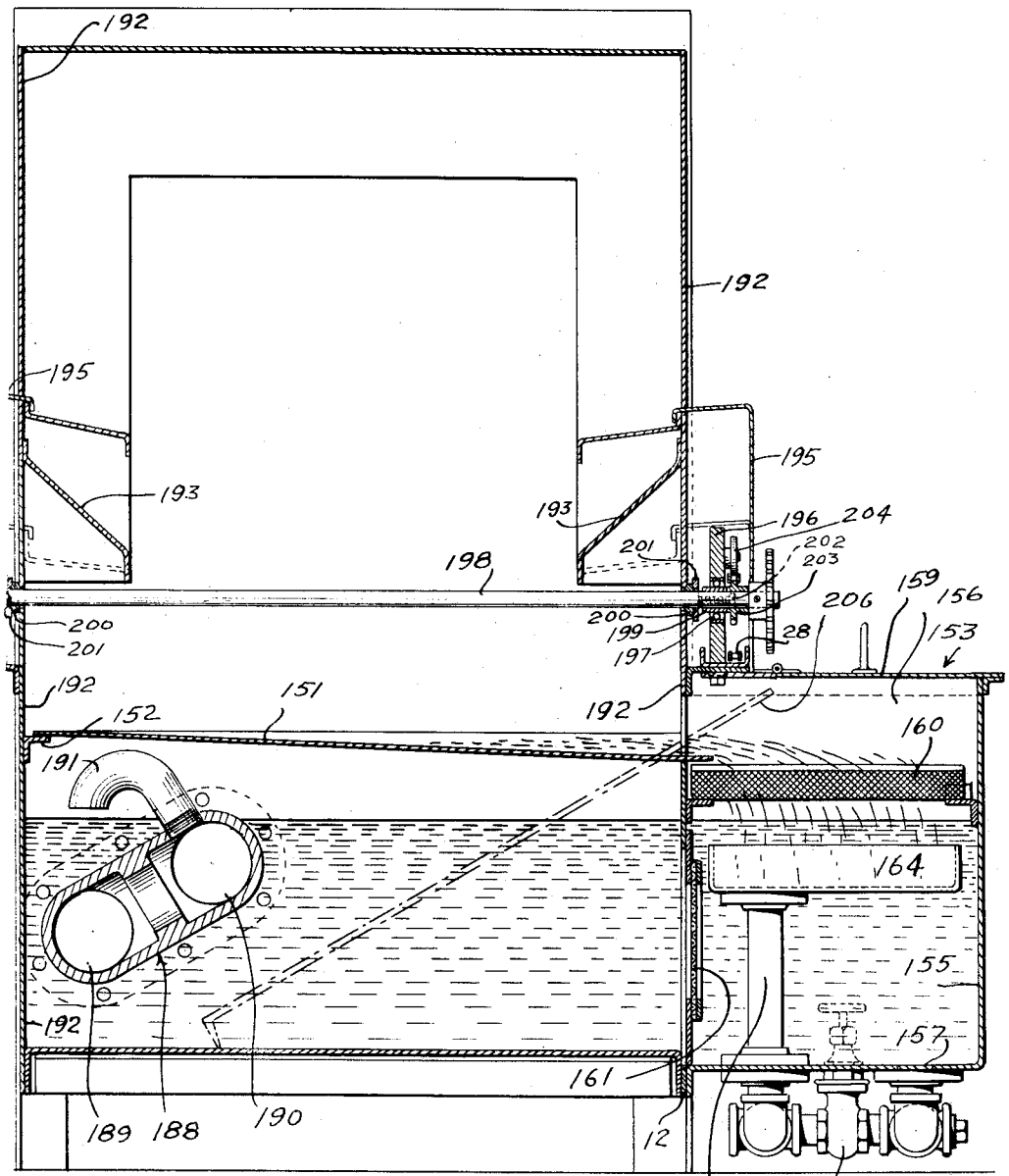
Figure 23 is a transverse, vertical section through a further modified form of treating unit.

In Figure 23 there is shown a treating chamber which is generally similar to that described in connection with Figures 19 and 22, but in which the heating means is varied. In this form a gas burning stove 188 is submerged in the treating solution. A mixture of gas and air is fed into the pipe 189 of the stove and burns therein. The burning gases or products of the combustion pass thence into the pipe 190 of the stove and are delivered by flue 191 above the surface of the washing solution in the tank. The gases are forced to travel between the surface of the walls and the baffle or drain 151 so that the baffle becomes heated to a high temperature. The washing solution falling on the drain flows over its surface and is heated by the drain.

In this form of the invention the driving mechanism for the conveyor is of different form from any of these previously described, and the mechanism is supported in a somewhat different manner. The side plates 192 are not channeled but extend continuously downward. Suitable deflectors and guides 193 are mounted within the side plates and extend downward adjacent the side bounds of the conveyor. These guides 193 project outward beyond the ends of the enclosure and form supports for channel housings 195 which extend throughout the length of the conveyor. Within each housing 195 there is mounted a bearing beam 196 which supports ball bearings 197. The conveyor rollers 198 have bearings 199 fixed upon them which roll in the ball bearings 197. The rollers are provided with washers or gaskets 200 for sealing the openings through the side plate 192. These washers are pressed toward the side plate by a metal plate 201. Screws 202 are threaded through bearing beam 196 and press the metal plate 201 against the washer 200. The roller 198 has a sprocket 203 fast thereon which is driven by the chain 28. The chain 28 is guided in engagement with sprockets 203 by pinions 204 which are rotatably supported in the bearing beam 196.

Figure 23 also illustrates how the bottom of the main tank may be cleaned by means of a scraper 206 when the hinged cover of the side tank is raised and the baffle 151 is removed.

In Figures 20 and 21 the construction of the conveyor which operates through the washing chamber is modified by elevating the delivery end of said conveyor. This feature is very advantageous for the reason that where articles are washed which have concavities in opposite faces, the articles are tumbled or inverted as they pass from one conveyor to the other. Thus the pools of washing solution which would be held in the upper concave portions are drained, so that the washing solution is not carried by the articles into the rinsing tank. The end roller 207 at the delivery end of the conveyor 208 is elevated and is provided with a sprocket 209 driven through a chain 210 from a sprocket 211 on the roller 212, this roller 212 being the rearmost roller on which the rinsing conveyor 213 runs.

A chain 209a is driven by a sprocket on the roller 207 and in turn drives the elevated rollers 213 and 214 and the end roller 212b of the level series. The roller 212b drives chain 28 through a sprocket 212a and chain 28, in turn, drives the other rollers of the washing unit conveyor. Provision may be made of elevated rollers 213 and 214 for supporting the inclined portion of the conveyor 208. It should be noted that the rollers 212 and 207 are located above the drain 215 that carries the washing solution back into the washing tank and not above the drain 216 that carries the rinsing solution back into the rinsing tank. Thus, any interchange of treating materials will consist of carrying the rinsing water into the washing tank and not of carrying the washing solution into the rinsing tank.

Figure 24:
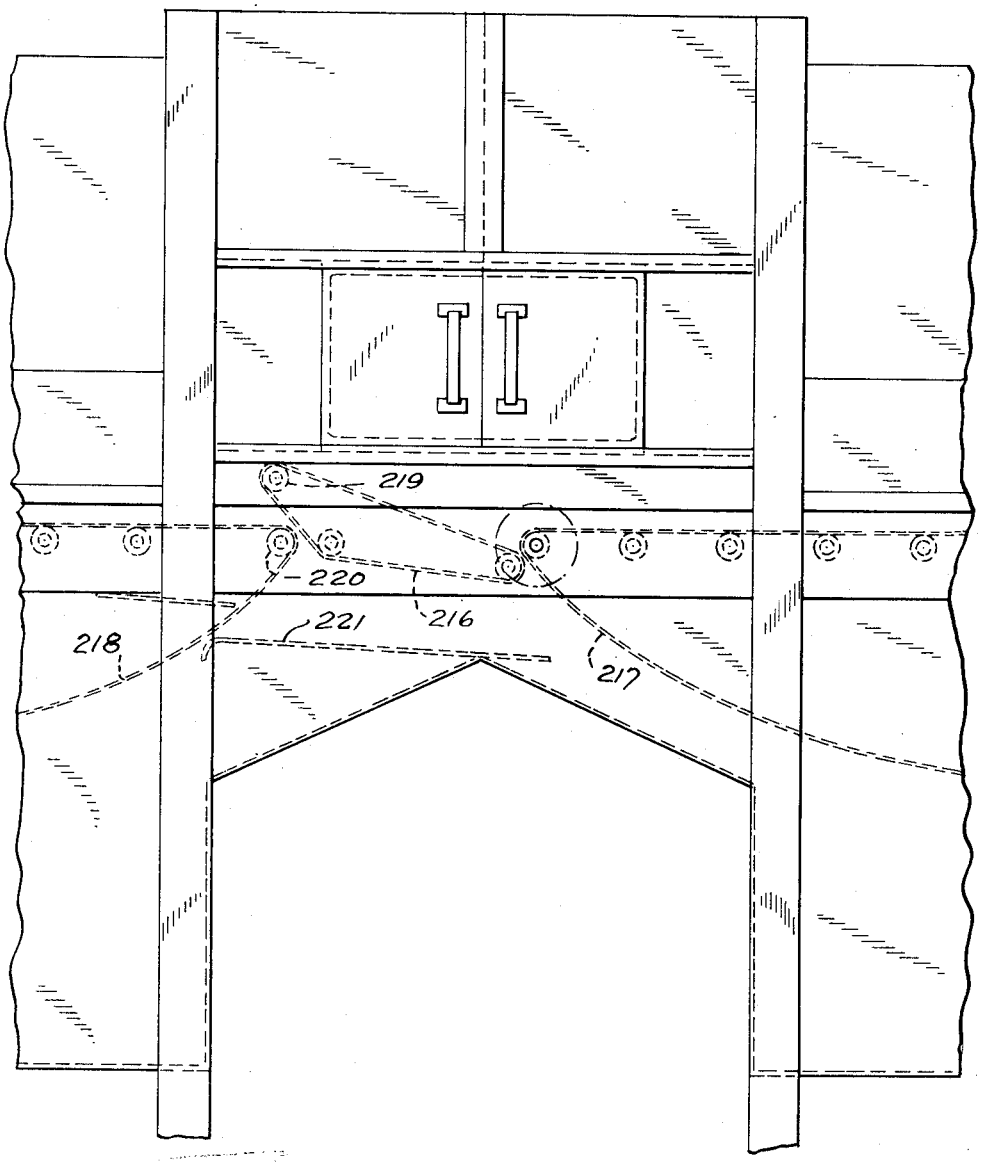
Figure 24 is a fragmentary, side elevation showing a further modification of the conveyor mechanism of Figure 19.

In Figure 24 a further modification of the conveyor mechanism is shown in which a short, intermediate conveyor 216 is employed between the washing conveyor 217 and the rinsing conveyor 218 for tumbling the articles. In this construction the short conveyor is driven from the elevated roller 219 which in turn is driven from the rearmost roller 220 on which conveyor 218 runs. Where this short, intermediate conveyor is used, the interchange of treating materials between the tanks is very slight, for the reason that the short conveyor is not subjected to the projector apparatus of either tank. A drip baffle 221 is provided beneath the overlapping portion of conveyors 218 and 216 for conducting any material dripping off the inclined conveyor back into the washing tank.

Variations may be resorted to and parts of the improvements may be used without others, within the scope of the appended claims.

What I claim is:

1. In an article treating machine, in combination, a plurality of treating chambers, means in each chamber for projecting a treating liquid upward onto the articles, conveyor belts individual to the chambers for conducting the articles therethrough, said conveyor belts being arranged end to end, and roller tables consisting of numerous driven rollers supporting and yieldingly driving the conveyor belts at frequent intervals, the adjacent end rollers being of such small diameter and located so close together that no substantial gap or trough intervenes between them, and the conveyor belts being composed entirely of transversely extending, substantially parallel, spiral wires, flexibly interlaced, and being sufficiently flexible to conform to the curvature of the small rollers, whereby small articles may be transferred automatically from one conveyor belt to another.

2. In an article treating machine, in combination, a treating chamber, means in the chamber for projecting treating liquid on the articles, and conveying means for feeding articles through said chamber comprising a driven roller table, the rolls of which, including the delivery end roll, are of small diameter, and a flat wire mesh conveyor running thereon and frictionally driven thereby consisting only of transversely extending, substantially parallel zigzag wires flexibly interlaced with one another, to render the conveyor sufficiently flexible to conform readily to the surface curvature of small rollers without substantial distortion of the wires themselves.

3. In an article treating machine, in combination, a treating chamber, means in said chamber for projecting treating liquid on the articles, and conveying means for conducting articles through the chamber comprising a driven roller table and an open network, flexible conveyor belt composed entirely of transversely extending, substantially parallel, interlaced spiral wires, said conveyor being frictionally driven by said rollers, and supported by them in a plane clear of the projecting means.

4. In an article treating machine, in combination, a treating chamber, a series of spaced driven rollers in said chamber, an open mesh, flexible conveyor belt composed entirely of transversely extending, substantially parallel, interlaced spiral wires, said conveyor being supported on said rollers and driven thereby for conducting articles through the chamber, and means below said rollers trained to project treating liquid upwardly between the rollers and through the conveyor belt against the articles, said rollers being far enough apart to permit free passage of the projected material between them but close enough together to support the conveyor belt flat without substantial sagging, and clear of the projecting means.

5. In an apparatus for treating articles, a conveyor for feeding the articles comprising a series of driven rollers, and a flat wire mesh conveyor belt thereon consisting only of transversely extending, substantially parallel members flexible interlaced, and frictionally driven by said rollers, the rollers being arranged to provide supporting contact for the conveyor belt with sufficient frequency to prevent substantial sagging, but being of such small diameter that the major portion of the belt is unobstructed from below, and means below the rollers trained to project treating liquid upward between them.

6. In an article treating machine, in combination, a treating chamber, an untensioned endless, open-network, flexible conveyor belt therein, composed entirely of transversely extending, substantially parallel, spiral wires, flexibly interlaced, a roller table consisting of a multiplicity of driving rollers placed at sufficiently frequent intervals to support the active stretch of the untensioned belt substantially in a single plane, means for driving said rollers, and upwardly directed projector jets located below the roller table but above the idle stretch of the conveyor belt and trained to project a treating agent upward between the rollers, the rollers being of such small diameter that the major portion of the table is open to permit unobstructed upward passage of the projected material.

7. In a machine for projecting a hot treating agent onto articles including a treating chamber, in combination, a multiplicity of transversely extending, closely spaced, parallel rollers spanning the chamber, and extending through a wall thereof, packings for sealing the openings through which the rollers pass to the exterior of the chamber, and common means independent of the rollers for maintaining the packings in engagement with the chamber.

8. In an article treating machine, in combination, a plurality of treating units, each comprising a treating chamber, a tank for the treating material, a drain to such tank, means for projecting the treating material onto the articles, and a conveyor for the articles, said conveyors arranged in tandem and terminating above the drains to the tanks of their respective units, each conveyor comprising an untensioned endless, open network, flexible conveyor belt consisting only of transversely extending wires flexibly interlaced, and a roller table on which the conveyor belt is mounted consisting of end rollers, a multiplicity of intermediate rollers, and means for driving all of said rollers, the adjacent ends of the conveyors being so close together that small articles are transferred directly from one to another of them.

9. In an article treating machine, in combination, a treating chamber having a tank, a conveyor belt adapted to carry articles in said chamber mounted over said tank and having its ends co-terminous with the ends of said tank, means in said chamber for projecting a liquid treating agent onto the articles on said conveyor belt, and rollers for supporting said conveyor belt at each end thereof, a roller at one end of said conveyor belt being of a sufficiently small diameter to permit the close spacing of the end of said belt with the adjacent end of another belt so that no substantial gap or trough intervenes between them, and the conveyor belt being composed entirely of transversely extending, substantially parallel, spiral wires, flexibly interlaced, and being sufficiently flexible to conform to the curvature of the small roller whereby small articles may be transferred automatically from one conveyor belt to another, the radii of said small roller and of the wire spirals being of the same order of magnitude.

10. In an article treating machine, in combination, a treating chamber having a tank, an untensioned conveyor belt adapted to carry articles in said chamber mounted over said tank and having its ends substantially co-terminous with the ends of said tank, means in said chamber for projecting a liquid treating agent onto the articles on said conveyor belt, and a roller table consisting of numerous driven rollers supporting the conveyor belt at frequent intervals, a roller at one end of said conveyor belt being of a sufficiently small diameter to permit the close spacing of the end of said belt with the adjacent end of another belt so that no substantial gap or trough intervenes between them, and the conveyor belt being composed entirely of transversely extending, substantially parallel, spiral wires, flexibly interlaced, and being sufficiently flexible to conform to the curvature of the small roller whereby small articles may be transferred automatically from one conveyor belt to another.

In testimony whereof I have affixed my signature to this specification.

ERICH R. ZADEMACH.